(12) United States Patent
Liang et al.

(10) Patent No.: US 11,652,967 B2
(45) Date of Patent: May 16, 2023

(54) PROJECTION DEVICE AND PROJECTION IMAGE CORRECTION METHOD THEREOF

(71) Applicant: ALi Corporation, Hsinchu (TW)

(72) Inventors: Lun Liang, Guangdong (CN); Zhao-Dong Zhang, Guangdong (CN)

(73) Assignee: ALi Corporation, Hsinchu (TW)

( * ) Notice: Subject to any disclaimer, the term of this patent is extended or adjusted under 35 U.S.C. 154(b) by 49 days.

(21) Appl. No.: 17/488,340

(22) Filed: Sep. 29, 2021

(65) Prior Publication Data

US 2022/0141436 A1 May 5, 2022

(30) Foreign Application Priority Data

Oct. 30, 2020 (CN) .......................... 202011186479.4

(51) Int. Cl.
*H04N 9/31* (2006.01)
*G06T 5/00* (2006.01)

(52) U.S. Cl.
CPC ........... *H04N 9/3188* (2013.01); *G06T 5/006* (2013.01); *H04N 9/3185* (2013.01); *G06T 2207/20112* (2013.01)

(58) Field of Classification Search
CPC .... G03B 21/008; G03B 21/28; G03B 21/145; G03B 21/147; G03B 21/208; H04N 9/3179; H04N 9/3185; H04N 9/3188; H04N 9/3194; G06T 5/00; G06T 5/001; G06T 5/002; G06T 5/003; G06T 5/006
See application file for complete search history.

(56) References Cited

U.S. PATENT DOCUMENTS

| | | | | |
|---|---|---|---|---|
| 8,950,872 B2 * | 2/2015 | Hasegawa | .......... | H04N 1/00769 382/172 |
| 9,514,716 B2 * | 12/2016 | Shinozaki | ............ | H04N 9/3147 |
| 10,578,955 B2 * | 3/2020 | Chiba | .................. | H04N 9/3185 |

FOREIGN PATENT DOCUMENTS

| | | |
|---|---|---|
| CN | 101329761 | 12/2008 |
| CN | 107147888 | 9/2017 |

* cited by examiner

*Primary Examiner* — Sultan Chowdhury
(74) *Attorney, Agent, or Firm* — JCIPRNET

(57) ABSTRACT

A projection device and a projection image correction method are provided. Four target coordinates of four target vertices forming a target quadrilateral boundary are obtained. A first trapezoidal boundary is obtained according to a predetermined image boundary and a first coordinate component of each of the four target coordinates. At least one edge of the target quadrilateral boundary is extended until intersecting with at least one of two reference line segments to obtain a second trapezoidal boundary. Bases of the first trapezoidal boundary are perpendicular to bases of the second trapezoidal boundary. First direction scaling processing is performed according to the first trapezoidal boundary, and second direction scaling processing is performed according to the second trapezoidal boundary, to scale an original image into a target image block aligned with the target quadrilateral boundary in an output image. The projection device projects the output image to display a rectangular projection image.

16 Claims, 9 Drawing Sheets

PROJECTION DEVICE AND PROJECTION IMAGE CORRECTION METHOD THEREOF

CROSS-REFERENCE TO RELATED APPLICATION

This application claims the priority benefit of China application serial no. 202011186479.4, filed on Oct. 30, 2020. The entirety of the above-mentioned patent application is hereby incorporated by reference herein and made a part of this specification.

BACKGROUND

Technical Field

The disclosure relates to a projection technology, and particularly relates to a projection device and a projection image correction method thereof.

Description of Related Art

With the advancement of technology, various projection devices have been widely applied to various occasions, such as presentations, speeches, theaters, audio-visual teaching, interactive teaching and home theater systems, etc. The projection device is a display device used for generating projection images. An imaging principle of the projection device involves converting an illumination light beam generated by an illumination system into an image light beam through an imaging device, and then projecting the image light beam onto a projection surface or a wall through a projection lens to form a projection image.

It should be noted that when a lens optical axis of the projection device is not perpendicular to the projection surface or the wall, the projection image on the projection surface or the wall may have keystone distortion, which causes reduction in projection quality. Namely, the projection device must be placed in a way that the lens optical axis thereof is perpendicular to the projection surface, so that the projection image will not be distorted. A user may manually adjust a placement position and a placement manner of the projection device but is probably unable to adjust the projection image to an ideal state due to environmental restrictions. In order to solve the above problem, before the projection device performs projection, an image processing chip inside the projection device may be used to perform image pre-distortion processing to achieve keystone correction. Therefore, how to implement image pre-distortion processing with a low-cost and good correction effect to achieve the keystone correction function is indeed an issue of concern to those skilled in the art.

SUMMARY

The disclosure is directed to a projection device and a projection image correction method thereof, which are adapted to suppress deformation or distortion of a projection image after keystone correction, thereby improving the projection quality.

An embodiment of the disclosure provides a projection image correction method adapted to a projection device. The method includes following steps. Four target coordinates of four target vertices are obtained, wherein the four target vertices form a target quadrilateral boundary. A first trapezoidal boundary is obtained according to a predetermined image boundary and a first coordinate component of each of the four target coordinates. At least one edge of the target quadrilateral boundary is extended until intersecting with at least one of two reference line segments to obtain a second trapezoidal boundary. Bases of the first trapezoidal boundary are perpendicular to bases of the second trapezoidal boundary, and the two reference line segments are determined according to two of the four target coordinates and are located within the predetermined image boundary. Then, first direction scaling processing is performed according to the first trapezoidal boundary, and second direction scaling processing is performed according to the second trapezoidal boundary, to scale an original image into a target image block aligned with the target quadrilateral boundary in an output image. The projection device projects the output image onto a projection surface to display a rectangular projection image.

An embodiment of the disclosure provides a projection device including an image processing circuit. The image processing circuit is configured to perform the following steps. Four target coordinates of four target vertices are obtained, wherein the four target vertices form a target quadrilateral boundary. A first trapezoidal boundary is obtained according to a predetermined image boundary and a first coordinate component of each of the four target coordinates. At least one edge of the target quadrilateral boundary is extended until intersecting with at least one of two reference line segments to obtain a second trapezoidal boundary. Bases of the first trapezoidal boundary are perpendicular to bases of the second trapezoidal boundary, and the two reference line segments are determined according to two of the four target coordinates and are located within the predetermined image boundary. Then, first direction scaling processing is performed according to the first trapezoidal boundary, and second direction scaling processing is performed according to the second trapezoidal boundary, to scale an original image into a target image block aligned with the target quadrilateral boundary in an output image. The projection device projects the output image onto a projection surface to display a rectangular projection image.

Based on the above description, in the embodiments of the disclosure, the four target coordinates that determine the target vertices are first obtained based on a perspective transformation relationship. Then, two trapezoidal boundaries are obtained according to the four target coordinates of the target vertices, and the bases of the two trapezoidal boundaries are perpendicular to each other. By sequentially performing the first direction scaling processing and the second direction scaling processing on the original image according to the two trapezoidal boundaries, the original image is scaled to a target image block aligned with the target quadrilateral boundary in the output image. In this way, the keystone correction function is achieved through image scaling processing with low complexity and low cost, thereby improving the quality of the projection image.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Figure 1A:
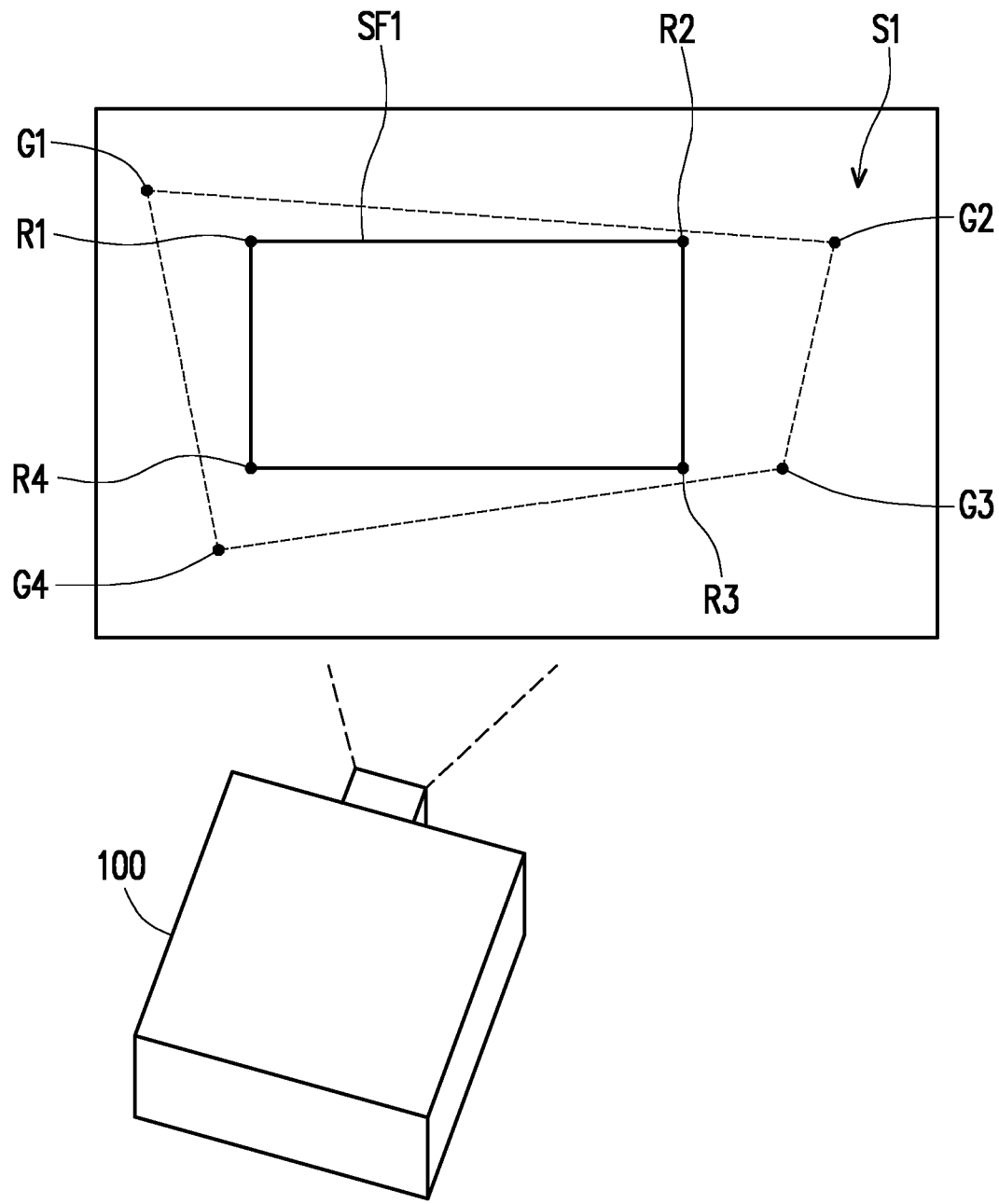
FIG. 1A is a schematic diagram of projection performed by a projection device according to an embodiment of the disclosure.

Reference will now be made in detail to the present exemplary embodiments of the disclosure, examples of which are illustrated in the accompanying drawings. Wherever possible, the same reference numbers are used in the drawings and the description to refer to the same or like parts.

Figure 1B:
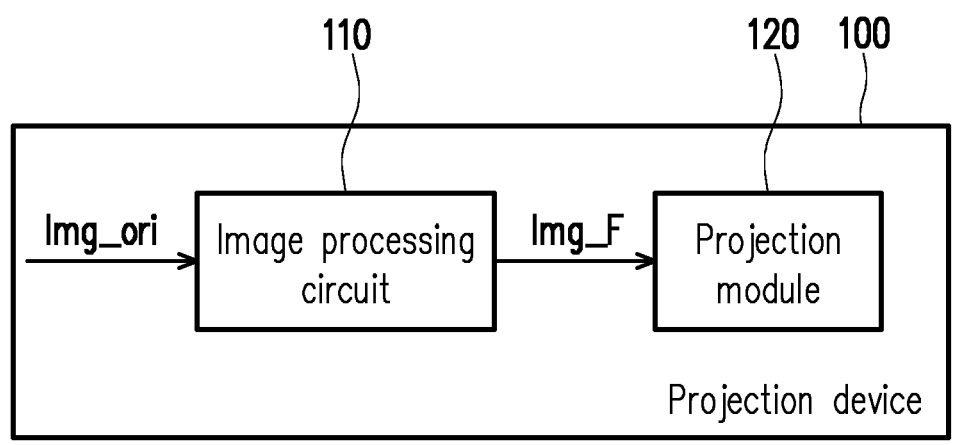
FIG. 1B is a schematic diagram of a projection device according to an embodiment of the disclosure.

FIG. 1A is a schematic diagram of projection performed by a projection device according to an embodiment of the disclosure. FIG. 1B is a schematic diagram of a projection device according to an embodiment of the disclosure. Referring to FIG. 1A and FIG. 1B, the projection device 100 may project an image on the projection surface S1, which may be a liquid crystal projector (LCP), a digital light processing (DLP) projector, or a reflective liquid crystal on silicon (LCOS) projection display device, etc. In the embodiment, the projection device 100 may include an image processing circuit 110 and a projection module 120. The projection module 120 may include a light source module, an optical engine module, a lens module, and a related optical and circuit control assembly. The projection device 100 may receive an original image Img_ori through a data transmission interface, the image processing circuit 110 is used to perform image pre-distortion processing on the original image Img_ori, and the projection module 120 then projects an output image Img_F generated through the image pre-distortion processing onto the projection surface S1.

It is known that if the projection device 100 does not perform any image pre-distortion processing, and a lens optical axis of the projection device 100 is not perpendicular to the projection surface S1, a keystone distortion image KF1 on the projection surface S1 may have a phenomenon of projection image deformation and content distortion. Therefore, in the embodiment of the disclosure, in order to realize a keystone correction function, the image processing circuit 110 may perform image pre-distortion processing on the original image Img_ori, so that the projection device 100 may project a rectangular projection image SF1 with undistorted content on the projection surface S1. In the embodiment of the disclosure, the image processing circuit 110 implements the image pre-distortion processing by performing horizontal scaling processing and vertical scaling processing. To be more specific, the image processing circuit 110 performs image scaling processing on the original image Img_ori according to coordinate information of the positioning points R1-R4 to generate the output image Img_F. Therefore, when the projection module 120 projects the output image Img_F generated through the image scaling processing, the rectangular projection image SF1 may be displayed in a rectangular region defined by the positioning points R1-R4 on the projection surface S1.

In an embodiment, the positioning points R1-R4 on the projection surface S1 may be marked by a user. More specifically, the projection device 100 may perform projection without performing image pre-distortion processing, and then the user may use an input device (such as a remote controller or keys on the projection device 100) to mark the positioning points R1-R4 within an image range of the keystone distortion image KF1. Alternatively, in an embodiment, the positioning points R1-R4 on the projection surface S1 may be determined based on sensing data of a distance sensor or an image sensor of the projection device 100 itself. Based on the positioning points R1-R4 on the projection surface S1, the projection device 100 may obtain a target quadrilateral boundary required by the image pre-distortion processing according to a perspective transformation relationship, and perform the image scaling processing on the original image Img_ori based on the target quadrilateral boundary.

To be specific, when the projection device 100 projects a rectangular test image that is not subjected to image pre-distortion processing, a non-rectangular keystone distortion image KF1 is displayed on the projection surface S1. Thus, the image processing circuit 110 may obtain coordinates of four vertices G1-G4 of the projection image KF1 on the projection surface S1 by, for example, performing photographing through an image sensor. Then, the image processing circuit 110 may calculate a corresponding perspective transformation matrix according to the coordinates of the four vertices G1-G4 and coordinates of four image vertices of the original image Img_ori. In this way, after obtaining the positioning points R1-R4 on the projection surface S1, the image processing circuit 110 may derive the target quadrilateral boundary formed by four target vertices in a projection image coordinate system according to the aforementioned perspective transformation matrix and the coordinates of the positioning points R1-R4, and deform and reduce image dimensions of the original image Img_ori to fit the target quadrilateral boundary.

Figure 2:
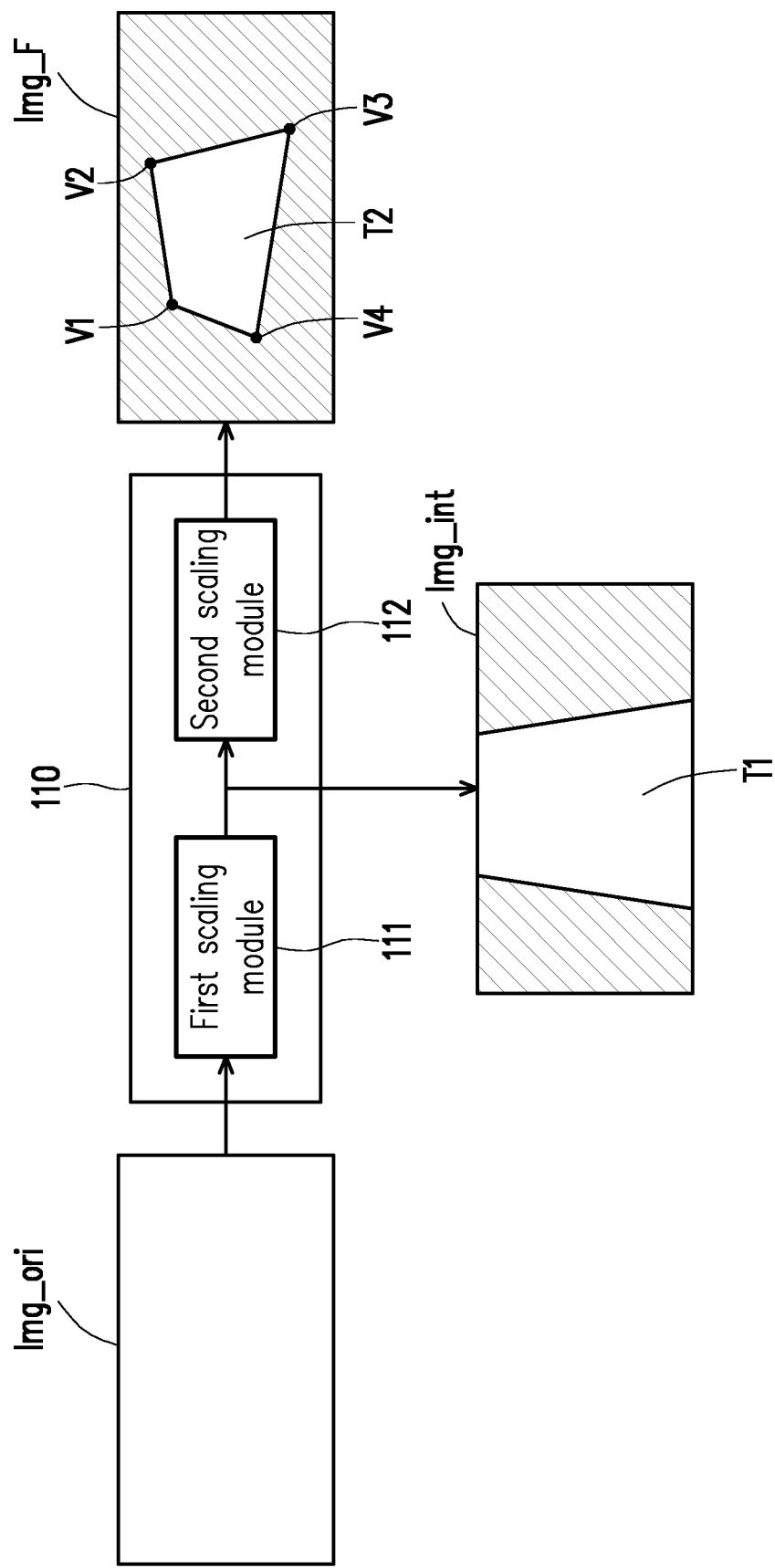
FIG. 2 is a schematic diagram of an image processing circuit according to an embodiment of the disclosure.

FIG. 2 is a schematic diagram of an image processing circuit according to an embodiment of the disclosure. Referring to FIG. 2, in an embodiment, after determining the positioning points R1-R4 on the projection surface S1, the image processing circuit 110 may obtain a plurality of target coordinates of a plurality of target vertices V1-V4 corresponding to the positioning points R1-R4. As described above, the image processing circuit 110 may obtain the target coordinates of the target vertices V1-V4 in the projection image coordinate system according to the coordinates of the positioning points R1-R4 and the perspective transformation relationship. The aforementioned target vertices V1-V4 form a target quadrilateral boundary. In this way, by first reducing the original image Img_ori to a target image block that fits a target deformation range, the projection device 100 may subsequently project the rectangular projection screen SF1 without content distortion.

As shown in FIG. 2, the image processing circuit 110 may include a first scaling module 111 and a second scaling module 112. In the embodiment, the first scaling module 111 may perform first scaling processing associated with a first direction on the original image Img_ori to generate an intermediate image Img_int including a trapezoidal image block T1. The second scaling module 111 may perform second scaling processing associated with a second direction on the intermediate image Img_int to generate the output image Img_F including a target image block T2. In other words, the image processing circuit 110 may reduce and deform the original image Img_ori into the target image block T2 aligned with the target quadrilateral boundary in the output image Img_F. The first direction is perpendicular to the second direction. Namely, if the first direction is a vertical direction (or referred to as a Y-axis direction), the second direction is a horizontal direction (or referred to as an X-axis direction). If the first direction is the horizontal direction, the second direction is the vertical direction. In the embodiment of FIG. 2, the first scaling module 111 performs horizontal scaling processing, and the second scaling module 112 performs vertical scaling processing. However, the disclosure does not limit a sequence of the horizontal scaling processing and the vertical scaling processing, and in other embodiments, the first scaling module 111 may first perform the vertical scaling processing, and then the second scaling module 112 performs the horizontal scaling processing.

It should be noted that, in one embodiment, a horizontal reduction ratio and a vertical reduction ratio corresponding to different pixel rows or pixel columns are not fixed values, so that the first scaling module 111 and the second scaling module 112 both convert a rectangular input image block into a trapezoidal image block.

In the embodiment of FIG. 2, the first scaling module 111 performs a first direction scaling processing (i.e., the horizontal scaling processing) on the original image Img_ori to generate the trapezoidal image block T1 of the intermediate image Img_int. To be specific, the first scaling module 111 takes pixels of the original image Img_ori as input pixels, and generates output pixels after performing the horizontal scaling processing to obtain the trapezoidal image block T1. Then, the second scaling module 112 performs a second direction scaling processing (i.e., the vertical scaling processing) on the intermediate image Img_int to generate the target image block T2 aligned with the target quadrilateral boundary. In this way, compared with directly performing perspective transformation on the original image Img_ori to generate an output image, the embodiment of the disclosure may implement image pre-distortion processing through image scaling processing to greatly reduce computational complexity. In addition, the image scaling processing further has an advantage of suitable for being implemented by hardware logic circuits.

It should be noted that, in one embodiment, each time when the vertical scaling processing or the horizontal scaling processing is completed, the first scaling module 111 and the second scaling module 112 both fill a background block around the reduced trapezoidal image block to produce an image that is complied with a predetermined image size (or referred to as an image resolution). As shown in the embodiment of FIG. 2, after the first scaling module 111 performs the first scaling processing on the original image Img_ori, the first scaling module 111 fills the background block on both sides of the trapezoidal image block T1 to generate the intermediate image Img_int. After the second scaling module 112 performs the second scaling processing on the intermediate image Img_int, the second scaling module 112 fills the background block around the target image block T2 to generate the output image Img_F. The output image Img_F includes the target image block T2 and the background block surrounding the target image block T2 (i.e., an oblique line region shown in FIG. 2), and the projection device 100 may project the target image block T2 and the background block onto the projection surface S1. In an embodiment, the aforementioned background block may be a black block. In this regard, when the projection module 120 of the projection device 100 projects the output image Img_F onto the projection surface S1, since the background block does not contain image content of the original image Img_ori, the rectangular projection image SF1 may be displayed on the projection surface S1.

Figure 3:
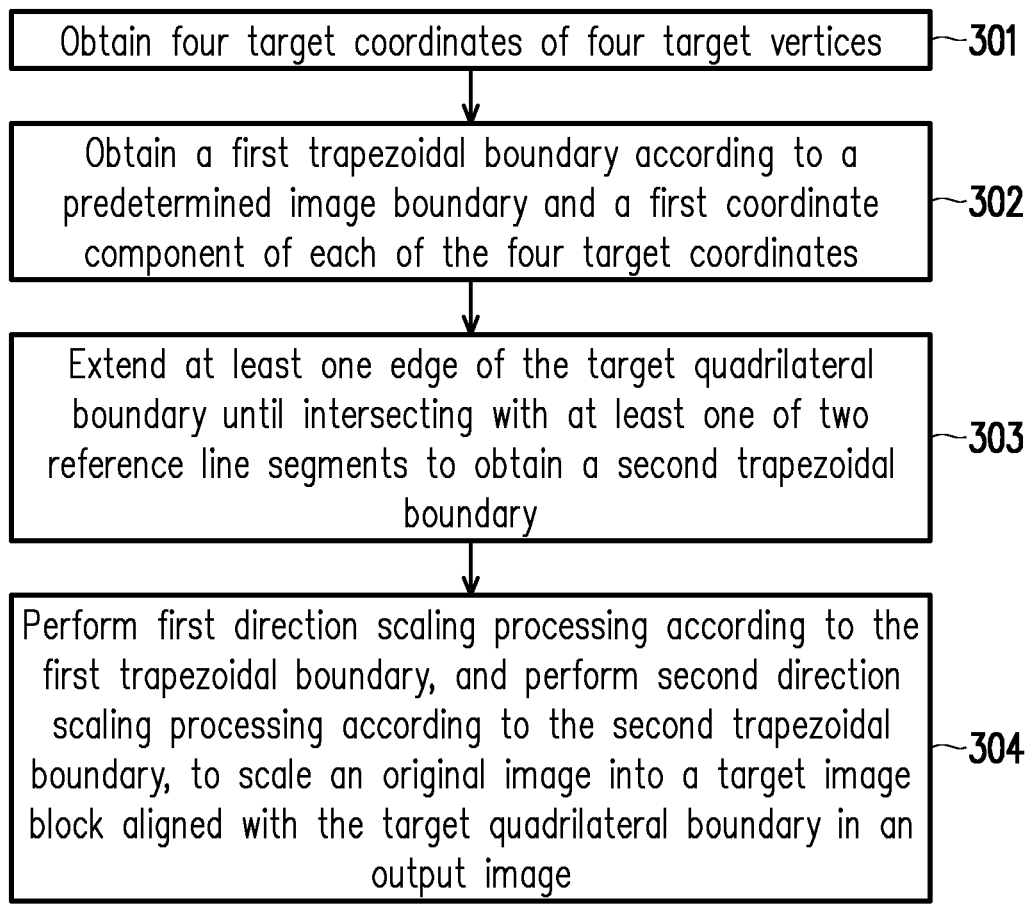
FIG. 3 is a flowchart illustrating a projection image correction method according to an embodiment of the disclosure.

Embodiments are listed below to describe implementation details of the image scaling processing performed by the image processing circuit 110. Referring to FIG. 3, FIG. 3 is a flowchart illustrating a projection image correction method according to an embodiment of the disclosure, and the method flow of FIG. 3 may be implemented by the projection device 100 of FIG. 1B.

First, in step S301, the image processing circuit 110 obtains four target coordinates of four target vertices. The four target vertices form a target quadrilateral boundary. In an embodiment, the projection device 110 projects a test image on the projection surface to display a keystone distortion image (such as the keystone distortion image KF1 in FIG. 1A). Then, the image processing circuit 110 may obtain four positioning points (for example, the positioning points R1-R4 in FIG. 1A) within the keystone distortion image. The image processing circuit 110 may use a perspective transformation matrix to convert the four coordinates of the four positioning points into the four target coordinates of the four target vertices (for example, the target vertices V1-V4 in FIG. 2). It is known that X-coordinate components of the target coordinates are greater than or equal to 0 and less than an image width (for example, 1280 pixels) of a predetermined image size; and Y-coordinate components of the target vertices are greater than or equal to 0 and less than an image height (for example, 720 pixels) of the predetermined image size.

It should be noted that a term "predetermined image boundary" is an image boundary defined according to the predetermined image size (or referred to as image resolution). In an embodiment, the predetermined image boundary includes a left boundary with an X-coordinate component equal to 0, a right boundary with an X-coordinate component equal to the image width minus 1, an upper boundary with a Y-coordinate component equal to 0, and a lower boundary with a Y-coordinate component equal to the image height minus 1.

In step S302, the image processing circuit 110 obtains a first trapezoidal boundary according to the predetermined image boundary and a first coordinate component of each of the four target coordinates. The first trapezoidal boundary is used to reduce and deform a rectangular image block into a trapezoidal image block aligned with the first trapezoidal boundary. In an embodiment, the first trapezoidal boundary is used to reduce and deform the original image Im_ori into a trapezoidal image block (for example, the trapezoidal image block T1 shown in FIG. 2) aligned with the first trapezoidal boundary.

In step S303, the image processing circuit 110 extends at least one edge of the target quadrilateral boundary until intersecting with at least one of two reference line segments to obtain a second trapezoidal boundary. Bases of the second trapezoidal boundary are located on the two reference line segments, and legs of the second trapezoidal boundary include two edges of the target quadrilateral boundary and extending line segments thereof. The image processing circuit 110 may extend one or two opposite edges of the target quadrilateral boundary. The second trapezoidal boundary is used to reduce and deform a rectangular image block into a trapezoidal image block aligned with the second trapezoidal boundary. The second trapezoidal boundary also includes two parallel bases and two non-parallel legs. The bases of the first trapezoidal boundary are perpendicular to the bases of the second trapezoidal boundary. Namely, the first trapezoidal boundary and the second trapezoidal boundary are respectively two trapezoidal boundaries whose bases extend in the horizontal direction and the vertical direction. In addition, the two reference line segments are parallel to each other and extend in the horizontal direction or the vertical direction. The two reference line segments are located within the predetermined image boundary and are determined based on two of the target coordinates. In an embodiment, the reference line segments may be determined according to a largest first coordinate component and a smallest first coordinate component in the target coordinates. Alternatively, the reference line segments may be determined according to a largest second coordinate component and a smallest second coordinate component in the target coordinates. A first coordinate component of a first reference line segment is less than or equal to the smallest first coordinate component in the target coordinates, and a first coordinate component of a second reference line segment is greater than or equal to the largest first coordinate component in the target coordinates. The two reference line segments may be located outside the first trapezoidal boundary, or may be overlapped with the first trapezoidal boundary.

It should be noted that if the image scaling processing with nonlinear calculation of pixel-line is not considered, determination of the first trapezoidal boundary is irrelevant to the second trapezoidal boundary. If the image scaling processing with nonlinear calculation of pixel-line is considered, the determination of the first trapezoidal boundary is related to the second trapezoidal boundary. Here, the "image scaling processing with nonlinear calculation of pixel-line" means that there is a nonlinear conversion relationship between row positions or column positions of input pixels and row positions or column positions of output pixels. To be specific, in an embodiment, the image processing circuit 110 may directly determine the first trapezoidal boundary according to a certain coordinate component of each target coordinate. The image processing circuit 110 may directly take the first coordinate component of each target coordinate as first coordinate components of the four boundary vertices of the first trapezoidal boundary, and determine second coordinate components of the four boundary vertices of the first trapezoidal boundary based on the predetermined image boundary, so as to obtain the first trapezoidal boundary formed by the four boundary vertices. Alternatively, in an embodiment, the image processing circuit 110 may first determine the second trapezoidal boundary according to the content of the aforementioned embodiment, and then obtain a nonlinear function based on the second trapezoidal boundary. Thereafter, the image processing circuit 110 may respectively determine the first coordinate components of the four boundary vertices of the first trapezoidal boundary according to the first coordinate component of each target coordinate and the nonlinear function, and determine the second coordinate components of the four boundary vertices of the first trapezoidal boundary based on the predetermined image boundary, so as to obtain the first trapezoidal boundary. The first trapezoidal boundary includes two bases parallel with each other and two legs non-parallel with each other. It is known that step S303 may be executed before or after step S302. Namely, an execution order of step S302 and step S303 is not limited.

It should be noted that, in the embodiment in which the image processing circuit 110 first performs the horizontal scaling processing and then performs the vertical scaling processing (i.e., the first direction scaling processing is the horizontal scaling processing, and the second direction scaling processing is the vertical scaling processing), the bases of the first trapezoidal boundary extend in the horizontal direction; the bases of the second trapezoidal boundary extend in the vertical direction; and the reference line segments extend in the vertical direction. Alternatively, in other embodiments where the image processing circuit 110 first performs the vertical scaling processing and then the horizontal scaling processing (i.e., the first direction scaling processing is the vertical scaling processing, and the second direction scaling processing is the horizontal scaling processing), the bottom sizes of the first trapezoidal boundary extend in the vertical direction; the bases of the second trapezoidal boundary extend in the horizontal direction; and the reference line segments extend in the horizontal direction.

In step S304, the image processing circuit 110 performs the first direction scaling processing according to the first trapezoidal boundary, and then performs the second direction scaling processing according to the second trapezoidal boundary to scale an original image into a target image block aligned with the target quadrilateral boundary in the output image Img_F. To be specific, in the image scaling processing, a reduction ratio corresponding to each row or column of the output pixels and the input pixels are determined based on the first trapezoidal boundary and the second trapezoidal boundary. However, a pixel interpolation algorithm of the horizontal scaling processing and the vertical scaling processing is not limited by the disclosure, which may be set according to actual applications. Thus, after the image processing circuit 110 generates the output image Img_F including the target image block, the projection device 100 may project the output image Img_F onto a projection surface to display a rectangular projection image.

An example of how to determine the first trapezoidal boundary and the second trapezoidal boundary according to the target coordinates of the target vertices is described in detail below.

Figure 4A:
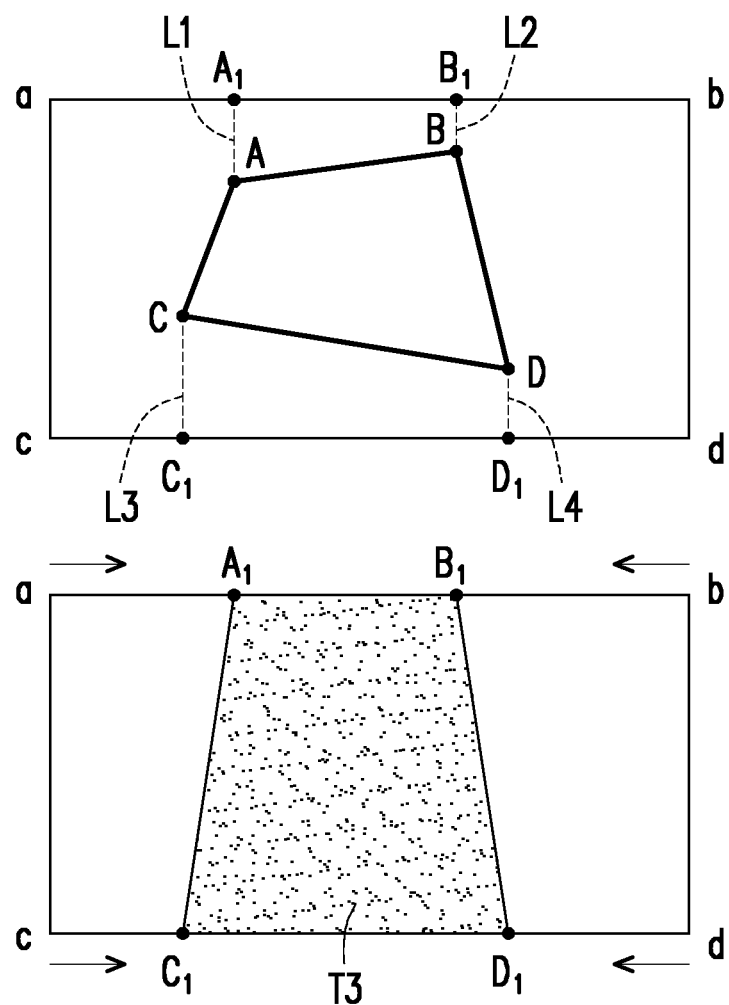
FIG. 4A is a schematic diagram of horizontal scaling processing according to an embodiment of the disclosure.
Figure 4B:
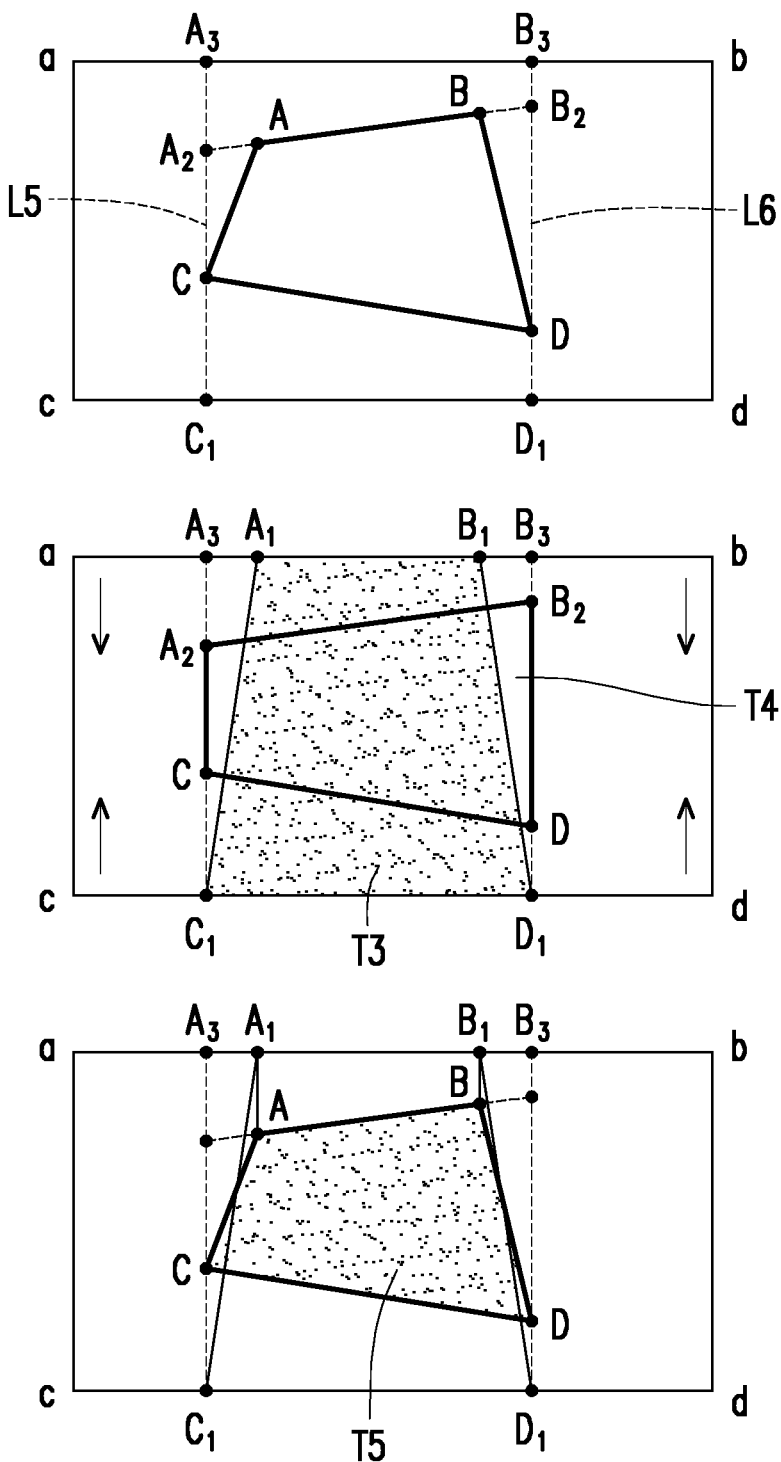
FIG. 4B is a schematic diagram of vertical scaling processing according to an embodiment of the disclosure.

FIG. 4A is a schematic diagram of horizontal scaling processing according to an embodiment of the disclosure. FIG. 4B is a schematic diagram of vertical scaling processing according to an embodiment of the disclosure. In FIG. 4A and FIG. 4B, a situation that the first direction scaling processing is the horizontal scaling processing, and the second direction scaling processing is the vertical scaling processing is taken as an example for description, but the disclosure is not limited thereto.

It should be noted that in FIG. 4A and FIG. 4B, the image scaling processing with linear calculation of pixel-line is taken as an example for description. The "image scaling processing with linear calculation of pixel-line" means that row positions or column positions of the input pixels are equal to row positions or column positions of the output pixels. In other words, in the vertical scaling processing with linear calculation of pixel-line, the image processing circuit 110 takes the input pixels of an $m^{th}$ column of the input image to generate the output pixels of an $m^{th}$ column of the output image. In the horizontal scaling processing with linear calculation of pixel-line, the image processing circuit 110 takes the input pixels of an $m^{th}$ row of the input image to generate the output pixels of an $m^{th}$ row of the output image.

In an embodiment, the image processing circuit 110 may obtain a plurality of vertical lines intersecting with the predetermined image boundary according to the first coordinate components of the multiple target coordinates, and the vertical lines intersect with the predetermined image boundary at multiple perpendicular foot coordinates. First coordinate components of these perpendicular foot coordinates are respectively the same as the first coordinate components of the target coordinates. The image processing circuit 110 may obtain the first trapezoidal boundary formed by these perpendicular foot coordinates. Referring to FIG. 4A, the image processing circuit 110 may obtain a plurality of vertical lines L1-L4 intersecting with upper and lower boundaries ab and cd according to X-coordinate components of the target coordinates A, B, C, and D. The vertical lines L1-L4 intersect with the upper and lower boundaries ab and cd of the predetermined image boundary at a plurality of perpendicular foot coordinates $A_1$, $B_1$, $C_1$, and $D_1$. Therefore, the image processing circuit 110 may obtain a first trapezoidal boundary $A_1B_1C_1D_1$ formed by the perpendicular foot coordinates $A_1$, $B_1$, $C_1$, and $D_1$. Therefore, during the horizontal scaling processing, the image processing circuit 110 may sequentially generate output pixels of each row in a trapezoidal image block T3 aligned with the first trapezoidal boundary $A_1B_1C_1D_1$ according to the input pixels of each row in the original image Img_ori.

Then, in the embodiment, the image processing circuit 110 may first define two reference line segments located within the predetermined image boundary and located outside the first trapezoidal boundary. In the embodiment, the image processing circuit 110 may determine the two reference line segments within the predetermined image boundary according to two of the target coordinates. Here, the image processing circuit 110 may determine positions of the reference line segments according to the two target coordinates with the largest X-coordinate component and the smallest X-coordinate component in the target coordinates. The X-coordinate component of the first reference line segment may be less than or equal to the smallest X-coordinate component, and the X-coordinate component of the second reference line segment may be greater than or equal to the largest X-coordinate component.

Referring to FIG. 4B, the image processing circuit 110 may respectively obtain a plurality of vertical lines L5-L6 intersecting with the upper and lower boundaries ab and cd according to the X-coordinate components of the target coordinates C and D. The vertical lines L5-L6 intersect with the upper and lower boundaries of the predetermined image boundary at a plurality of perpendicular foot coordinates $A_3$, $B_3$, $C_1$, and $D_1$. Therefore, the image processing circuit 110 may obtain two reference line segments $A_3C_1$ and $B_3D_1$ used to determine a second trapezoidal boundary. The reference line segments $A_3C_1$ and $B_3D_1$ are perpendicular to the bases of the first trapezoidal boundary $A_1B_1C_1D_1$. In the embodiment, the image processing circuit 110 may extend at least one edge AB of the target quadrilateral boundary ABCD until it intersects with the two reference line segments $A_3C_1$ and $B_3D_1$ to obtain a second trapezoidal boundary $A_2CDB_2$. The bases of the second trapezoidal boundary $A_2CDB_2$ are located on the reference line segments $A_3C_1$ and $B_3D_1$. Based on the above description, during the vertical scaling processing, the image processing circuit 110 may sequentially generate output pixels of each column in a trapezoidal image block T4 aligned with the second trapezoidal boundary $A_2CDB_2$ according to the input pixels of each column in the rectangular image block aligned with a boundary $A_3C_1D_1B_3$. The rectangular image block aligned with the boundary $A_3C_1D_1B_3$ includes the trapezoidal image block T3 generated by the horizontal scaling processing. It is known that after the horizontal scaling processing and the vertical scaling processing, the original image Img_ori is reduced and deformed into a target image block T5 complied with the target quadrilateral boundary ABCD, and then the image processing circuit 110 fills the background block around the target image block T5 to generate the output image Img_F.

Although in FIG. 4A and FIG. 4B, the implementation method of first performing the horizontal scaling processing first and then performing the vertical scaling processing is taken as an example for description, those skilled in the art should undoubtedly deduce an implementation method of first performing the vertical scaling processing and then performing the horizontal scaling processing based on the aforementioned description. Generally, in the embodiment where the vertical scaling processing is first performed and then the horizontal scaling processing is performed, the image processing circuit 110 may first determine the first trapezoidal boundary according to the Y-coordinate components of the target coordinates and the predetermined image boundary (i.e., the left and right boundaries), and now the bases of the first trapezoidal boundary are along the vertical direction, so that the vertical scaling processing is performed according to the first trapezoidal boundary. Then, the image processing circuit 110 determines the second trapezoidal boundary by taking the reference line segments in the horizontal direction and extending at least one edge of the target quadrilateral boundary, and now the bases of the second trapezoidal boundary are in the horizontal direction, so that the horizontal scaling processing is performed according to the second trapezoidal boundary.

Figure 5A:
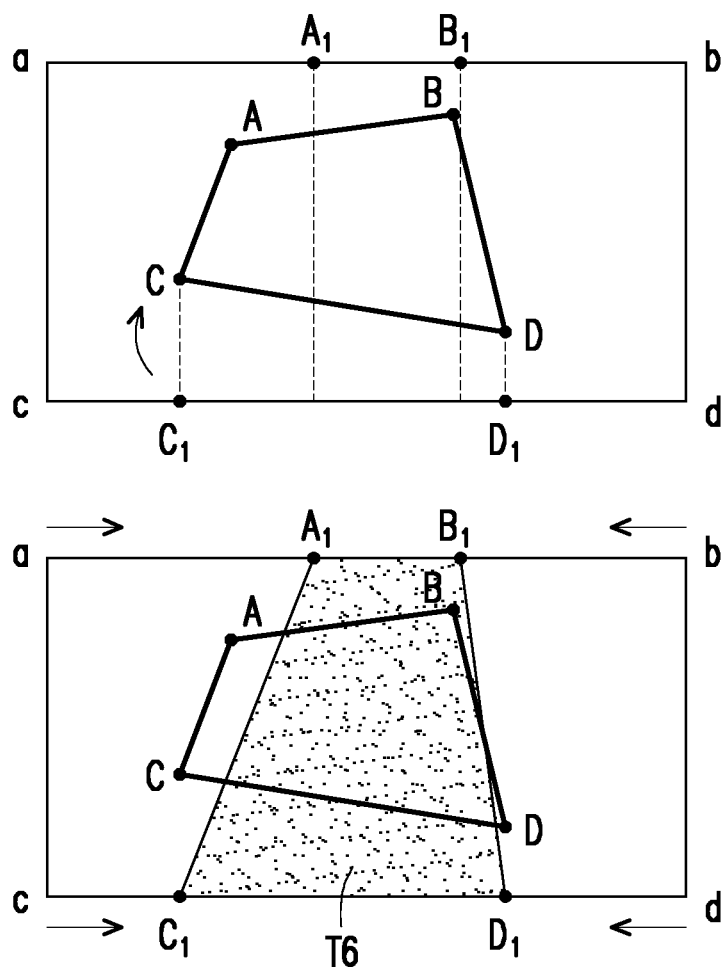
FIG. 5A is a schematic diagram of horizontal scaling processing according to an embodiment of the disclosure.
Figure 5B:
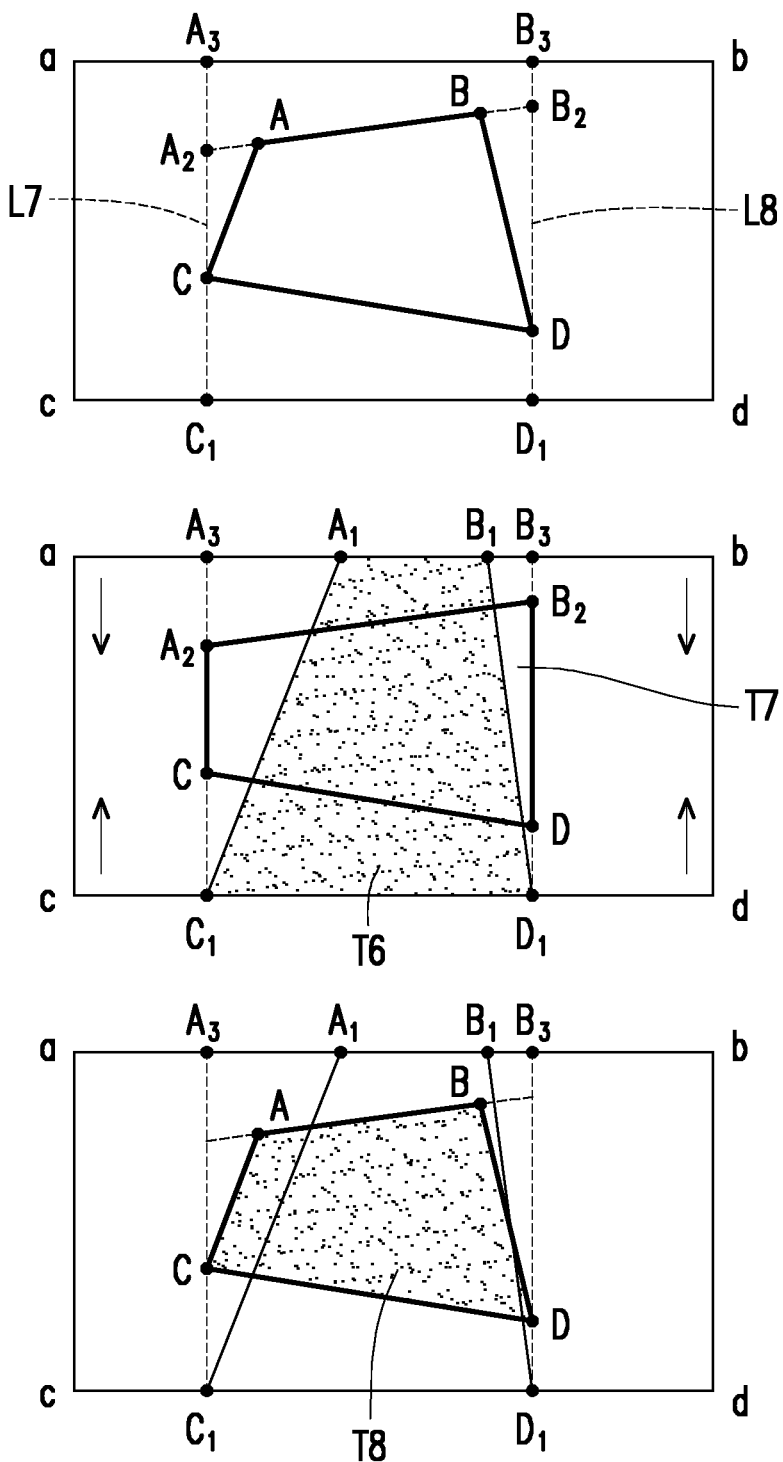
FIG. 5B is a schematic diagram of vertical scaling processing according to an embodiment of the disclosure.

FIG. 5A is a schematic diagram of horizontal scaling processing according to an embodiment of the disclosure. FIG. 5B is a schematic diagram of vertical scaling processing according to an embodiment of the disclosure. In FIGS. 5A and 5B, a situation that the first direction scaling processing is the horizontal scaling processing and the second direction scaling processing is the vertical scaling processing is taken as an example for description, but the disclosure is not limited thereto.

It should be noted that in FIG. 5A and FIG. 5B, the image scaling processing with nonlinear calculation of pixel-line is taken as an example for description. The "image scaling processing with nonlinear calculation of pixel-line" means that there is a nonlinear conversion relationship between row positions or column positions of the input pixels and row positions or column positions of the output pixels. To be specific, when the image processing circuit 110 performs the image scaling processing according to the input pixels to sequentially generate the output pixels of each row, as long as the row positions of the obtained input pixels and the row positions of the corresponding output pixel are not exactly the same, it is regarded as the "image scaling processing with nonlinear calculation of pixel-line". In other words, in the vertical scaling processing with nonlinear calculation of pixel-line, the image processing circuit 110 takes the input pixels of an $m^{th}$ column of the input image to generate the output pixels of an $n^{th}$ column of the output image. In the horizontal scaling processing with nonlinear calculation of pixel-line, the image processing circuit 110 takes the input pixels of an $m^{th}$ row of the input image to generate the output pixels of an $n^{th}$ row of the output image. When n is an integer greater than 1 and less than a predetermined image height, n is not always equal to m. In addition, in an actual calculation, m may also be a floating-point number. In this case, the input pixels of two adjacent or more rows/columns may be interpolated to obtain the input pixels of $m^{th}$ row/column.

In the embodiment, the image processing circuit 110 may sequentially determine the second trapezoidal boundary first and then determine the first trapezoidal boundary. Then, the image processing circuit 110 may first perform the horizontal scaling processing according to the first trapezoidal boundary, and then perform the vertical scaling processing according to the second trapezoidal boundary. In this way, the image processing circuit 110 may reduce and deform the original image Img_ori into a target image block complied with the target quadrilateral boundary.

An implementation method of sequentially determining the second trapezoidal boundary and the first trapezoidal boundary is first described below. Referring to FIG. 5B first, the image processing circuit 110 may determine the second trapezoidal boundary by taking a reference line segment in the vertical direction and extending at least one edge of the target quadrilateral boundary. Similar to the operation principle of FIG. 4B, in FIG. 5B, the image processing circuit 110 may respectively obtain a plurality of vertical lines L7-L8 intersecting with the upper and lower boundaries ab and cd according to the X-coordinate components of the target coordinates C and D. The vertical lines L7-L8 intersect with the upper and lower boundaries ab and cd of the predetermined image boundary at a plurality of perpendicular foot coordinates $A_3$, $B_3$, $C_1$, and $D_1$. Therefore, the image processing circuit 110 may obtain two reference line segments $A_3C_1$ and $B_3D_1$ used to determine a second trapezoidal boundary. The reference line segments $A_3C_1$ and $B_3D_1$ are perpendicular to the bases of the first trapezoidal boundary $A_1B_1C_1D_1$. In the embodiment, the image processing circuit 110 may extend at least one edge AB of the target quadrilateral boundary ABCD until it intersects with the two reference line segments $A_3C_1$ and $B_3D_1$ to obtain a second trapezoidal boundary $A_2CDB_2$. Therefore, the image processing circuit 110 may obtain the nonlinear relationship between the X coordinates of the input pixels and the X coordinates of the output pixels in the nonlinear vertical scaling processing according to the second trapezoidal boundary $A_2CDB_2$.

Then, the image processing circuit 110 may generate first coordinate components corresponding to the four boundary vertices of the four target coordinates according to the nonlinear relationship and the first coordinate component of each of the four target coordinates, and obtains the first trapezoidal boundary according to the predetermined image boundary and the first coordinate components of the four boundary vertices. Referring to FIG. 5A, the image processing circuit 110 may obtain the X-coordinate components of the boundary vertices $A_1$, $B_1$, $C_1$, and $D_1$ according to the X-coordinate components of the target coordinates A, B, C, and D and a nonlinear relationship. Therefore, the image processing circuit 110 may obtain the first trapezoidal boundary $A_1B_1C_1D_1$ formed by the boundary vertices $A_1$, $B_1$, $C_1$, and $D_1$. In detail, the image processing circuit 110 may generate the X-coordinate components of the boundary vertices $A_1$, $B_1$, $C_1$, and $D_1$ according to the X-coordinate components of the target coordinates A, B, C, and D through table lookup or a nonlinear function calculation. From another point of view, it is assumed that the X-coordinate component of the boundary vertex $A_1$ is m and the X-coordinate component of the target coordinate A is n, the image processing circuit 110 generates the output pixels of an $n^{th}$ column in the output image Img_F based on the input pixels of an $m^{th}$ column in the intermediate image Img_int. The aforementioned nonlinear relationship represents a nonlinear conversion relationship between the row positions or column positions of the input pixels and the row positions or column positions of the output pixels.

Therefore, during the horizontal scaling processing, the image processing circuit 110 may correspondingly generate the output pixels of each row in a trapezoidal image block T6 aligned with the first trapezoidal boundary $A_1B_1C_1D_1$ according to the input pixels of each row in the original image Img_ori. Then, referring to FIG. 5B, during the vertical scaling processing, the image processing circuit 110 may correspondingly generate the output pixels of each column in a trapezoidal image block T7 aligned with the second trapezoidal boundary $A_2CDB_2$ according to the input pixels of each column in the rectangular image block aligned with the boundary $A_3C_1D_1B_3$. The rectangular image block aligned with the boundary $A_3C_1D_1B_3$ includes the trapezoidal image block T6 generated by the horizontal scaling processing. It is known that after the horizontal scaling processing and the vertical scaling processing, the original image Img_ori is reduced and deformed into a target image block T8 complied with the target quadrilateral boundary ABCD, and then the image processing circuit 110 fills the background block around the target image block T8 to generate the output image Img_F.

Although in FIG. 5A and FIG. 5B, the implementation method of first performing the horizontal scaling processing first and then performing the vertical scaling processing is taken as an example for description, those skilled in the art should undoubtedly deduce an implementation method of first performing the vertical scaling processing and then performing the horizontal scaling processing based on the aforementioned description. Generally, in the embodiment where the vertical scaling processing is first performed and then the horizontal scaling processing is performed, the image processing circuit 110 determines the second trapezoidal boundary by taking the reference line segments in the horizontal direction and extending at least one edge of the target quadrilateral boundary, and now the bases of the second trapezoidal boundary are in the horizontal direction. Then, the image processing circuit 110 obtains a nonlinear relationship according to the second trapezoidal boundary, and determines the first trapezoidal boundary according to the Y-coordinate components of the target coordinates and the nonlinear relationship, and now the bases of the first trapezoidal boundary are in the vertical direction. Finally, the image processing circuit 110 may perform the vertical scaling processing according to the first trapezoidal boundary, and perform the horizontal scaling processing according to the second trapezoidal boundary.

It should be noted that the first trapezoidal boundary and the second trapezoidal boundary generated in FIG. 4A, FIG. 4B, FIG. 5A, and FIG. 5B may all be used to reduce and deform the original image Img_ori into the target image blocks T5 and T8 complied with the target quadrilateral boundary ABCD. However, since the first trapezoidal boundary and the second trapezoidal boundary of the embodiment shown in FIG. 4A and FIG. 4B are collocated with image scaling processing of with linear calculation of pixel-line, and the first trapezoidal boundary and the second trapezoidal boundary of the embodiment shown in FIG. 5A and FIG. 5B are collocated with image scaling processing with nonlinear calculation of pixel-line, image content of the target image block T5 in FIG. 4B and image content of the target image block T8 in FIG. 5B are different. Through the image scaling processing with nonlinear calculation of pixel-line and determination of the first trapezoidal boundary based on the nonlinear relationship shown in FIG. 5A, the projected image after the keystone correction is not only a rectangle but may also avoid image content distortion.

Figure 6:
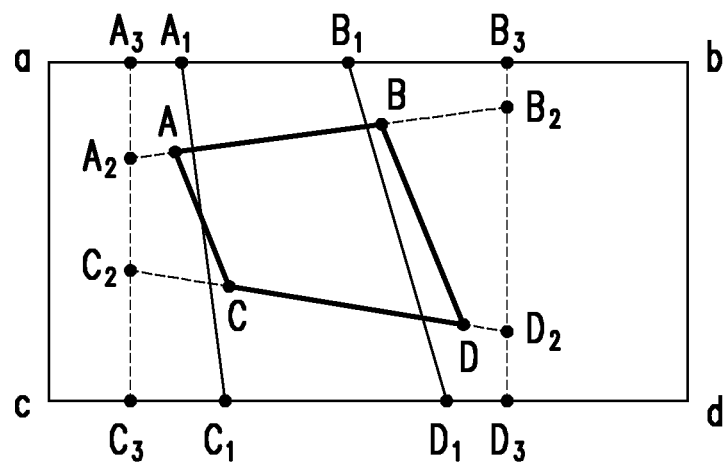
FIG. 6 is a schematic diagram of a first trapezoidal boundary and a second trapezoidal boundary according to an embodiment of the disclosure.

FIG. 6 is a schematic diagram of a first trapezoidal boundary and a second trapezoidal boundary according to an embodiment of the disclosure. In the embodiment of FIG. 6, the image processing circuit 110 first performs the horizontal scaling processing and then performs the vertical scaling processing. Referring to FIG. 6, the image processing circuit 110 may determine reference line segments $A_3C_3$ and $B_3D_3$ based on the X-coordinate components of the target coordinates A and D, and extend edges AB and CD to obtain a second trapezoidal boundary $A_2C_2D_2B_2$. Based on a nonlinear relationship obtained according to the second trapezoidal boundary $A_2C_2D_2B_2$, the image processing circuit 110 may determine the X-coordinate components of the boundary vertices $A_1$, $B_1$, $C_1$, and $D_1$ according to the X-coordinate components of the target coordinates A, B, C, and D. Therefore, the image processing circuit 110 may obtain the first trapezoidal boundary $A_1B_1C_1D_1$ formed by the boundary vertices $A_1$, $B_1$, $C_1$, and $D_1$. Therefore, the image processing circuit 110 may respectively perform the horizontal scaling processing and the vertical scaling processing according to the first trapezoidal boundary $A_1B_1C_1D_1$ and the second trapezoidal boundary $A_2C_2D_2B_2$.

Figure 7:
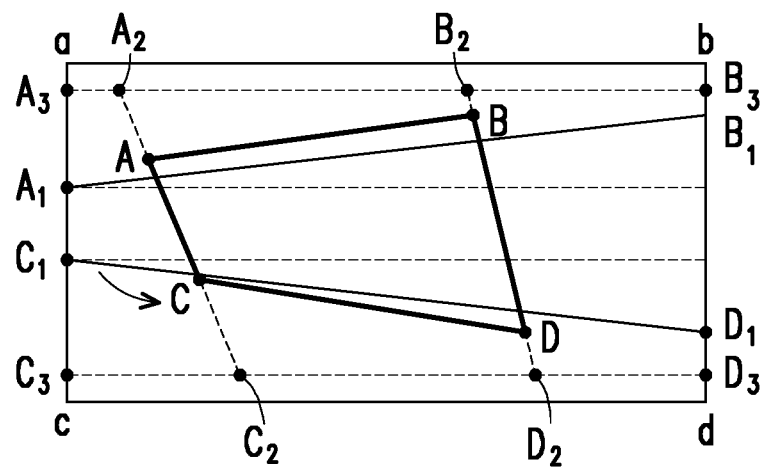
FIG. 7 is a schematic diagram of a first trapezoidal boundary and a second trapezoidal boundary according to an embodiment of the disclosure.

FIG. 7 is a schematic diagram of a first trapezoidal boundary and a second trapezoidal boundary according to an embodiment of the disclosure. In the embodiment of FIG. 7, the image processing circuit 110 first performs the vertical scaling processing and then performs the horizontal scaling processing. Referring to FIG. 7, the image processing circuit 110 may determine reference line segments $A_3B_3$ and $C_3D_3$ based on the Y-coordinate components of the target coordinates B and D, and extend an edge AC to obtain a second trapezoidal boundary $A_2C_2D_2B_2$. Based on a nonlinear relationship obtained according to the second trapezoidal boundary $A_2C_2D_2B_2$, the image processing circuit 110 may determine the Y-coordinate components of the boundary vertices $A_1$, $B_1$, $C_1$, and $D_1$ according to the Y-coordinate components of the target coordinates A, B, C, and D. Therefore, the image processing circuit 110 may obtain the first trapezoidal boundary $A_1B_1C_1D_1$ formed by the boundary vertices $A_1$, $B_1$, $C_1$, and $D_1$. Therefore, the image processing circuit 110 may respectively perform the vertical scaling processing and the horizontal scaling processing according to the first trapezoidal boundary $A_1B_1C_1D_1$ and the second trapezoidal boundary $A_2C_2D_2B_2$.

It is noted that in different embodiments, the related functions of the aforementioned image processing circuit 110 may use general programming languages (such as C or C++), hardware description languages (such as Verilog HDL or VHDL) or other suitable programming languages to implement as software, firmware or hardware. The software (or firmware) adapted to implement the related functions may be arranged as any known computer-accessible media, such as magnetic tapes, semiconductor memories, magnetic disks or compact disks (such as CD-ROM or DVD-ROM). The software (or firmware) may be stored in a computer-accessible medium (such as a memory), so that a processor of the computer may access/execute programming codes of the software (or firmware) to execute the related functions.

In summary, in the embodiment of the disclosure, the projection device may achieve image pre-distortion processing by performing horizontal scaling processing and vertical scaling processing, and then project a resulting image produced by the image scaling processing onto the projection surface, so that the viewer may view a rectangular and undistorted projection image from the projection surface. In the case of having target vertices, the embodiment of the disclosure may implement efficient and easy-to-implement image pre-distortion processing through the image scaling processing. Moreover, compared to implementing image pre-distortion processing based on the perspective transformation relationship, the embodiments of the disclosure may greatly reduce computational complexity and save a bandwidth consumed by the image processing circuit for accessing the memory.

It will be apparent to those skilled in the art that various modifications and variations can be made to the structure of the disclosure without departing from the scope or spirit of the disclosure. In view of the foregoing, it is intended that the disclosure cover modifications and variations of this disclosure provided they fall within the scope of the following claims and their equivalents.

What is claimed is:

1. A projection image correction method, adapted to a projection device, the projection image correction method comprising:
    obtaining four target coordinates of four target vertices, wherein the four target vertices form a target quadrilateral boundary;
    obtaining a first trapezoidal boundary according to a predetermined image boundary and a first coordinate component of each of the four target coordinates;
    extending at least one edge of the target quadrilateral boundary until intersecting with at least one of two reference line segments to obtain a second trapezoidal boundary, wherein bases of the first trapezoidal boundary are perpendicular to bases of the second trapezoidal boundary, and the two reference line segments are determined according to two of the four target coordinates and are located within the predetermined image boundary; and
    performing first direction scaling processing according to the first trapezoidal boundary, and performing second direction scaling processing according to the second trapezoidal boundary, so as to scale an original image into a target image block aligned with the target quadrilateral boundary in an output image, wherein the projection device projects the output image onto a projection surface to display a rectangular projection image.

2. The projection image correction method as claimed in claim 1, wherein the first direction scaling processing is horizontal scaling processing, the second direction scaling processing is vertical scaling processing, the bases of the first trapezoidal boundary extend in a horizontal direction, the bases of the second trapezoidal boundary extend in a vertical direction, and the reference line segments extend in the vertical direction.

3. The projection image correction method as claimed in claim 1, wherein the first direction scaling processing is vertical scaling processing, the second direction scaling processing is horizontal scaling processing, the bases of the first trapezoidal boundary extend in a vertical direction, the bases of the second trapezoidal boundary extend in a horizontal direction, and the reference line segments extend in the horizontal direction.

4. The projection image correction method as claimed in claim 1, wherein the step of performing the first direction scaling processing according to the first trapezoidal boundary, and performing the second direction scaling processing according to the second trapezoidal boundary, so as to scale the original image into the target image block aligned with the target quadrilateral boundary in the output image comprises:
  performing the first direction scaling processing on the original image according to the first trapezoidal boundary to generate a first trapezoidal image block; and
  performing the second direction scaling processing on a rectangular image block comprising the first trapezoidal image block according to the second trapezoidal boundary to obtain a second trapezoidal image block, wherein the second trapezoidal image block comprises the target image block.

5. The projection image correction method as claimed in claim 4, wherein the output image comprises the target image block and a background block surrounding the target image block, and the projection device projects the target image block and the background block onto the projection surface.

6. The projection image correction method as claimed in claim 1, wherein the step of obtaining the four target coordinates of the four target vertices comprises:
  projecting a test image on the projection surface by the projection device to display a keystone distortion image;
  obtaining four positioning points within the keystone distortion image; and
  using a perspective transformation matrix to convert four coordinates of the four positioning points into the four target coordinates of the four target vertices.

7. The projection image correction method as claimed in claim 1, wherein the step of extending the at least one edge of the target quadrilateral boundary until intersecting with at least one of the two reference line segments to obtain the second trapezoidal boundary comprises:
  determining the two reference line segments within the predetermined image boundary according to two of the four target coordinates, wherein the reference line segments are perpendicular to the bases of the first trapezoidal boundary, and the bases of the second trapezoidal boundary are located on the reference line segments.

8. The projection image correction method as claimed in claim 1, wherein the step of obtaining the first trapezoidal boundary according to the predetermined image boundary and the first coordinate component of each of the four target coordinates comprises:
  obtaining a nonlinear relationship based on the second trapezoidal boundary; and
  generating first coordinate components respectively corresponding to four boundary vertices of the four target coordinates according to the nonlinear relationship and the first coordinate component of each of the four target coordinates, and obtaining the first trapezoidal boundary according to the predetermined image boundary and the first coordinate components of the four boundary vertices.

9. A projection device comprising:
  an image processing circuit configured to:
    obtain four target coordinates of four target vertices, wherein the four target vertices form a target quadrilateral boundary,
    obtain a first trapezoidal boundary according to a predetermined image boundary and a first coordinate component of each of the four target coordinates,
    extend at least one edge of the target quadrilateral boundary until intersecting with at least one of two reference line segments to obtain a second trapezoidal boundary, wherein bases of the first trapezoidal boundary are perpendicular to bases of the second trapezoidal boundary, and the two reference line segments are determined according to two of the four target coordinates and are located within the predetermined image boundary, and
    perform first direction scaling processing according to the first trapezoidal boundary, and perform second direction scaling processing according to the second trapezoidal boundary, so as to scale an original image into a target image block aligned with the target quadrilateral boundary in an output image, wherein the projection device projects the output image onto a projection surface to display a rectangular projection image.

10. The projection device as claimed in claim 9, wherein the first direction scaling processing is horizontal scaling processing, the second direction scaling processing is vertical scaling processing, the bases of the first trapezoidal boundary extend in a horizontal direction, the bases of the second trapezoidal boundary extend in a vertical direction, and the reference line segments extend in the vertical direction.

11. The projection device as claimed in claim 9, wherein the first direction scaling processing is vertical scaling processing, the second direction scaling processing is horizontal scaling processing, the bases of the first trapezoidal boundary extend in a vertical direction, the bases of the second trapezoidal boundary extend in a horizontal direction, and the reference line segments extend in the horizontal direction.

12. The projection device as claimed in claim 9, wherein the image processing circuit is further configured to:
  perform the first direction scaling processing on the original image according to the first trapezoidal boundary to generate a first trapezoidal image block, and
  perform the second direction scaling processing on a rectangular image block comprising the first trapezoidal image block according to the second trapezoidal boundary to obtain a second trapezoidal image block, wherein the second trapezoidal image block comprises the target image block.

13. The projection device as claimed in claim 9, wherein the output image comprises the target image block and a background block surrounding the target image block, and the projection device projects the target image block and the background block onto the projection surface.

14. The projection device as claimed in claim 9, wherein the projection device projects a test image on the projection surface to display a keystone distortion image, and the image processing circuit is further configured to:
  obtain four positioning points within the keystone distortion image, and
  use a perspective transformation matrix to convert four coordinates of the four positioning points into the four target coordinates of the four target vertices.

15. The projection device as claimed in claim 9, wherein the image processing circuit is further configured to:
  determine the two reference line segments within the predetermined image boundary according to two of the four target coordinates, wherein the reference line segments are perpendicular to the bases of the first trapezoidal boundary, and the bases of the second trapezoidal boundary are located on the reference line segments.

16. The projection device as claimed in claim 9, wherein the image processing circuit is further configured to:
- obtain a nonlinear relationship based on the second trapezoidal boundary, and
- generate first coordinate components respectively corresponding to four boundary vertices of the four target coordinates according to the nonlinear relationship and the first coordinate component of each of the four target coordinates, and obtain the first trapezoidal boundary according to the predetermined image boundary and the first coordinate components of the four boundary vertices.

* * * * *